United States Patent
Kim et al.

(10) Patent No.: US 10,927,771 B2
(45) Date of Patent: Feb. 23, 2021

(54) CONTINUOUS VARIABLE VALVE DURATION APPARATUS AND ENGINE PROVIDED WITH THE SAME

(71) Applicants: Hyundai Motor Company, Seoul (KR); Kia Motors Corporation, Seoul (KR)

(72) Inventors: Hyeonwoo Kim, Seoul (KR); Kyoung Pyo Ha, Seongnam-si (KR); Back Sik Kim, Osan-si (KR); Jong Gu Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/701,926

(22) Filed: Dec. 3, 2019

(65) Prior Publication Data
US 2021/0017885 A1    Jan. 21, 2021

(30) Foreign Application Priority Data
Jul. 15, 2019    (KR) .................. 10-2019-0084890

(51) Int. Cl.
| | | |
|---|---|---|
| *F02D 13/02* | (2006.01) | |
| *F01L 1/047* | (2006.01) | |
| *F02D 41/00* | (2006.01) | |

(52) U.S. Cl.
CPC .. F02D 13/0215 (2013.01); *F01L 2001/0476* (2013.01); *F01L 2305/02* (2020.05); *F02D 2041/001* (2013.01)

(58) Field of Classification Search
CPC ... F01L 3/20; F01L 1/053; F01L 1/265; F01L 1/181; F01L 1/46; F01L 1/356;
(Continued)

(56) References Cited

U.S. PATENT DOCUMENTS

| | | | | |
|---|---|---|---|---|
| 3,955,480 A | * | 5/1976 | Wosegien | ............ B60T 17/086 92/130 R |
| 8,813,704 B2 | | 8/2014 | Kim et al. | |

(Continued)

FOREIGN PATENT DOCUMENTS

| | | |
|---|---|---|
| EP | 3 486 441 A1 | 5/2019 |
| KR | 10-1684559 B1 | 12/2016 |

OTHER PUBLICATIONS

Extended European Search Report dated Jun. 2, 2020 for European Patent Application No. 19213651.3.

*Primary Examiner* — Jorge L Leon, Jr.
(74) *Attorney, Agent, or Firm* — Morgan, Lewis & Bockius LLP

(57) ABSTRACT

A continuous variable valve duration apparatus may include a camshaft, a cam unit on which a cam is formed, wherein the camshaft is inserted into the cam unit, a guide bracket having an upper guide boss formed thereon, an internal wheel transmitting rotation of the camshaft to the cam unit, a wheel housing in which the internal wheel is rotatable inserted, wherein the wheel housing includes a guide shaft on which a guide screw thread is formed and the guide shaft is inserted into the upper guide boss to be movable, a worm wheel to which an internal screw thread engaging with the guide screw thread is formed therewithin, and to which an external screw thread is formed thereon, and a control shaft on which a control worm engaging with the external screw thread is formed.

22 Claims, 20 Drawing Sheets

(58) Field of Classification Search
CPC ........... F01L 2305/02; F01L 2001/0535; F01L
2001/0473; F01L 2001/0476; F01L
13/0026; F01L 13/0015; F01L 13/0215;
F01L 13/0234; F01L 13/0249; F01L
2013/103; F01L 2013/0089; F02D
13/023; F02D 13/0234; F02D 13/0249;
F02D 2041/001; F02D 13/0215
USPC ................................ 123/90.27, 90.39, 90.15
See application file for complete search history.

(56) References Cited

U.S. PATENT DOCUMENTS

| | | |
|---|---|---|
| 9,512,748 B2 | 12/2016 | Kim et al. |
| 9,574,467 B2 | 2/2017 | Ha |
| 9,869,215 B2 | 1/2018 | Son et al. |
| 2016/0363011 A1* | 12/2016 | Choi .................. F01L 13/0042 |
| 2017/0089230 A1 | 3/2017 | Son et al. |
| 2017/0167310 A1* | 6/2017 | Kim ........................ F01L 1/356 |
| 2017/0167312 A1 | 6/2017 | Son et al. |
| 2017/0284235 A1* | 10/2017 | Son ......................... F01L 1/356 |
| 2017/0284238 A1* | 10/2017 | Son ....................... F01L 1/0532 |
| 2017/0350479 A1* | 12/2017 | Shimizu .................. B25B 27/20 |
| 2018/0100448 A1* | 4/2018 | Ryu .................... F01L 13/0015 |

\* cited by examiner

CONTINUOUS VARIABLE VALVE DURATION APPARATUS AND ENGINE PROVIDED WITH THE SAME

CROSS-REFERENCE TO RELATED APPLICATION

The present application claims priority to Korean Patent Application No. 10-2019-0084890 filed on Jul. 15, 2019, the entire contents of which is incorporated herein for all purposes by this reference.

BACKGROUND OF THE INVENTION

Field of the Invention

The present invention relates to a continuous variable valve duration apparatus and an engine provided with the same. More particularly, the present invention relates to a continuous variable valve duration apparatus an engine provided with the same which may vary the opening duration of a valve according to operation conditions of an engine with a simple construction.

Description of Related Art

An internal combustion engine generates power by combusting fuel in a combustion chamber in an air media drawn into the chamber. Intake valves are operated by a camshaft to intake the air, and the air is drawn into the combustion chamber while the intake valves are open. Furthermore, exhaust valves are operated by the camshaft, and a combustion gas is exhausted from the combustion chamber while the exhaust valves are open.

Optimal operation of the intake valves and the exhaust valves depends on a rotation speed of the engine. That is, an optimal lift or optimal opening/closing timing of the valves depends on the rotation speed of the engine. To achieve such optimal valve operation depending on the rotation speed of the engine, various researches, such as designing of a plurality of cams and a continuous variable valve lift (CVVL) that can change valve lift according to engine speed, have been undertaken.

Also, to achieve such an optimal valve operation depending on the rotation speed of the engine, research has been undertaken on a continuously variable valve timing (CVVT) apparatus that enables different valve timing operations depending on the engine speed. The general CVVT may change valve timing with a fixed valve opening duration.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a continuous variable valve duration apparatus and an engine provided with the same which may vary the opening duration of a valve according to operation conditions of an engine and reduce noise and vibration.

A continuous variable valve duration apparatus according to an exemplary embodiment of the present invention may include a camshaft, a cam unit on which a cam is formed, wherein the camshaft is inserted into the cam unit, a guide bracket having an upper guide boss formed thereon, an internal wheel transmitting rotation of the camshaft to the cam unit, a wheel housing in which the internal wheel is rotatable inserted, wherein the wheel housing includes a guide shaft on which a guide screw thread is formed and the guide shaft is inserted into the upper guide boss to be movable, a worm wheel to which an internal screw thread engaging with the guide screw thread is formed therewithin, and to which an external screw thread is formed thereon, and a control shaft on which a control worm engaging with the external screw thread is formed.

The continuous variable valve duration apparatus may further include a thrust bearing mounted to the guide boss to support the worm wheel.

The continuous variable valve duration apparatus may further include a worm cap coupled to the guide bracket to support the thrust bearing.

A control shaft hole supporting the control shaft may be formed at the guide bracket.

The continuous variable valve duration apparatus may further include a control shaft bearing mounted to the control shaft hole to rotationally support the control shaft.

The continuous variable valve duration apparatus may further include a lower guide boss formed at the guide bracket and a guide rod formed in the wheel housing, and the guide rod inserted into the lower guide boss to guide the movement of the wheel housing.

A center portion of the internal wheel may deviate from an imaginary line connecting the upper guide boss and the lower guide boss.

The camshaft and the control shaft may be mounted on a line.

The internal screw thread and the guide screw thread of the worm wheel may be trapezoidal threads.

The wheel housing may include an upper stopper and a lower stopper formed thereon in contact with the guide bracket configured to limit the movement of the wheel housing.

The guide bracket may include a stepped surface formed thereon to prevent rotation of the wheel housing.

The continuous variable valve duration apparatus may further include a bracket oil hole formed in the guide bracket to supply lubrication oil to the worm wheel.

The continuous variable valve duration apparatus may further include a first sliding hole and a second sliding hole respectively formed at the internal wheel, a cam slot formed at the cam unit, a roller wheel connected to the camshaft and rotatably inserted into the first sliding hole, and a roller cam slidably inserted into the cam slot and rotatabley inserted into the second sliding hole.

The roller cam may include a roller cam body slidably inserted into the cam slot, a cam head rotatably inserted into the second sliding hole, and a protrusion configured to inhibit the roller cam from being removed.

The roller wheel may include a wheel body slidably connected to the camshaft and a wheel head rotatably inserted into the first sliding hole.

The continuous variable valve duration apparatus may further include a camshaft oil hole formed within the camshaft along a longitudinal direction of the camshaft, a body oil hole formed at the wheel body of the roller wheel and configured to communicate with the camshaft oil hole, and an oil groove formed at the wheel head of the roller wheel and configured to communicate with the body oil hole.

The cam unit may include a first cam portion and a second cam portion which are mounted corresponding to a cylinder and an adjacent cylinder respectively, and the internal wheel may include a first internal wheel and a second internal wheel transmitting the rotation of the camshaft to the first cam portion and the second cam portion, respectively.

The first internal wheel and the second internal wheel may be connected rotatable to each other.

The continuous variable valve duration apparatus may further include a bearing internally mounted within the wheel housing and configured to support the first internal wheel and the second internal wheel.

An engine according to an exemplary embodiment of the present invention may be provided with the continuous variable valve duration apparatus.

As described above, a continuous variable valve duration apparatus according to an exemplary embodiment of the present invention may vary an opening duration of a valve according to operation conditions of an engine, with a simple construction.

The continuous variable valve duration apparatus according to an exemplary embodiment of the present invention may be reduced in size and thus an entire height of a valve train may be reduced.

Since the continuous variable valve duration apparatus may be applied to an existing engine without excessive modification, thus productivity may be enhanced and production cost may be reduced.

The continuous variable valve duration apparatus according to an exemplary embodiment of the present invention may reduce the number of parts and reduce vibration and noise by applying a worm wheel.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
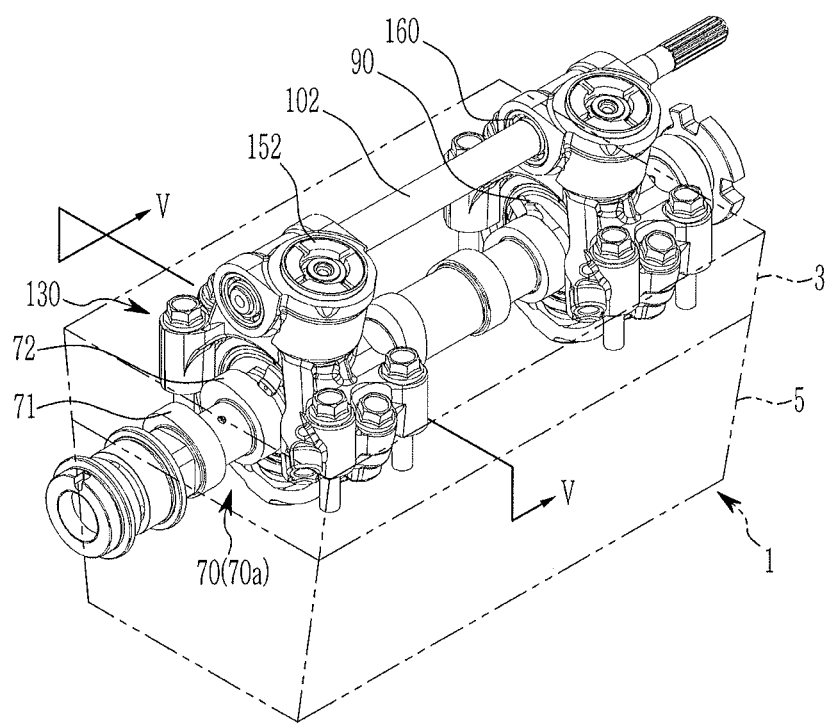
FIG. 1 is a perspective view of an engine provided with a continuous variable valve duration apparatus according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention A part irrelevant to the description will be omitted to clearly describe the present invention, and the same or similar elements will be designated by the same reference numerals throughout the specification.

In the drawings, the thickness of layers, films, panels, regions, etc., are exaggerated for clarity.

Throughout the specification and the claims, unless explicitly described to the contrary, the word "comprise" and variations such as "comprises" or "comprising", will be understood to imply the inclusion of stated elements but not the exclusion of any other elements.

An exemplary embodiment of the present invention will hereinafter be described in detail with reference to the accompanying drawings.

Figure 2:
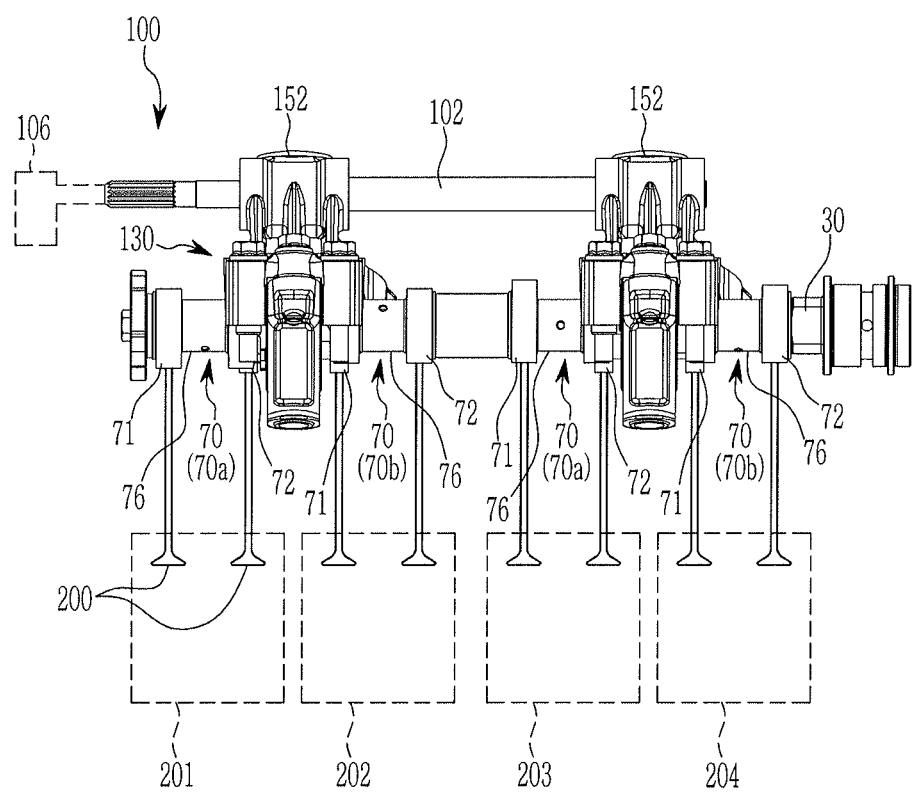
FIG. 2 is a side view of a continuous variable valve duration apparatus according to an exemplary embodiment of the present invention.

FIG. 1 is a perspective view of an engine provided with a continuous variable valve duration apparatus according to an exemplary embodiment of the present invention and FIG. 2 is a side view of a continuous variable valve duration apparatus according to an exemplary embodiment of the present invention.

Figure 3:
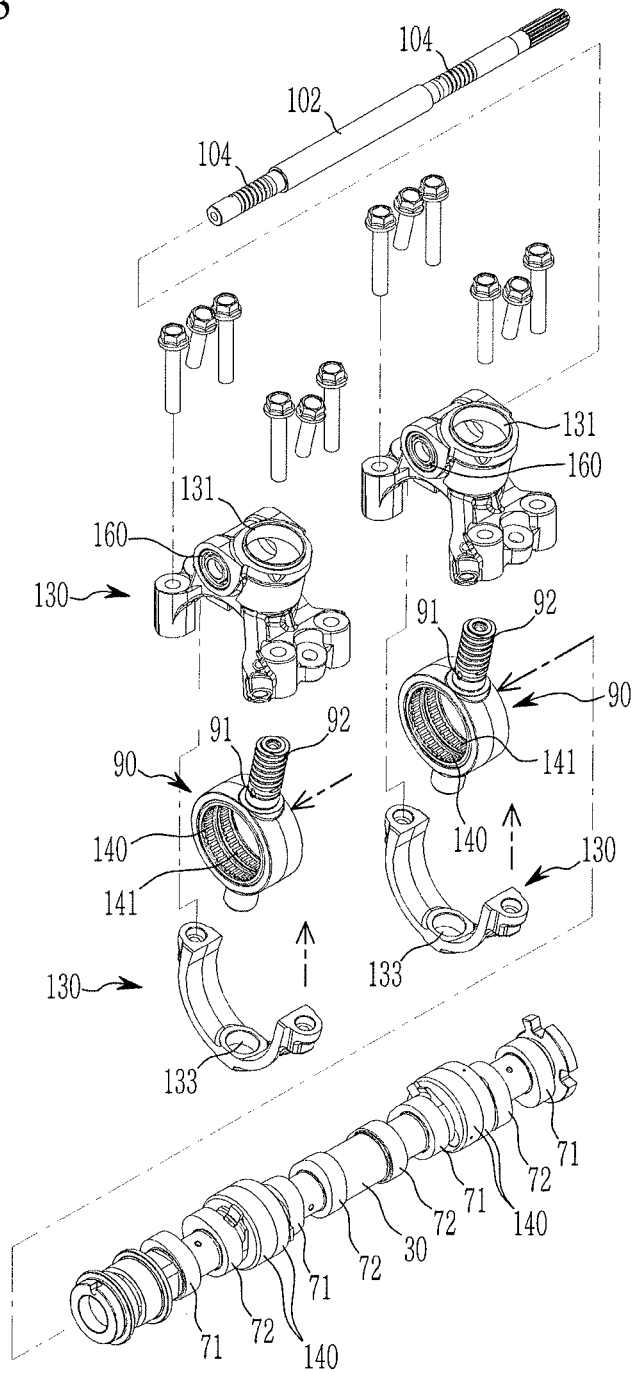
FIG. 3 is an exploded perspective view of a continuous variable valve duration apparatus according to an exemplary embodiment of the present invention.
Figure 4:
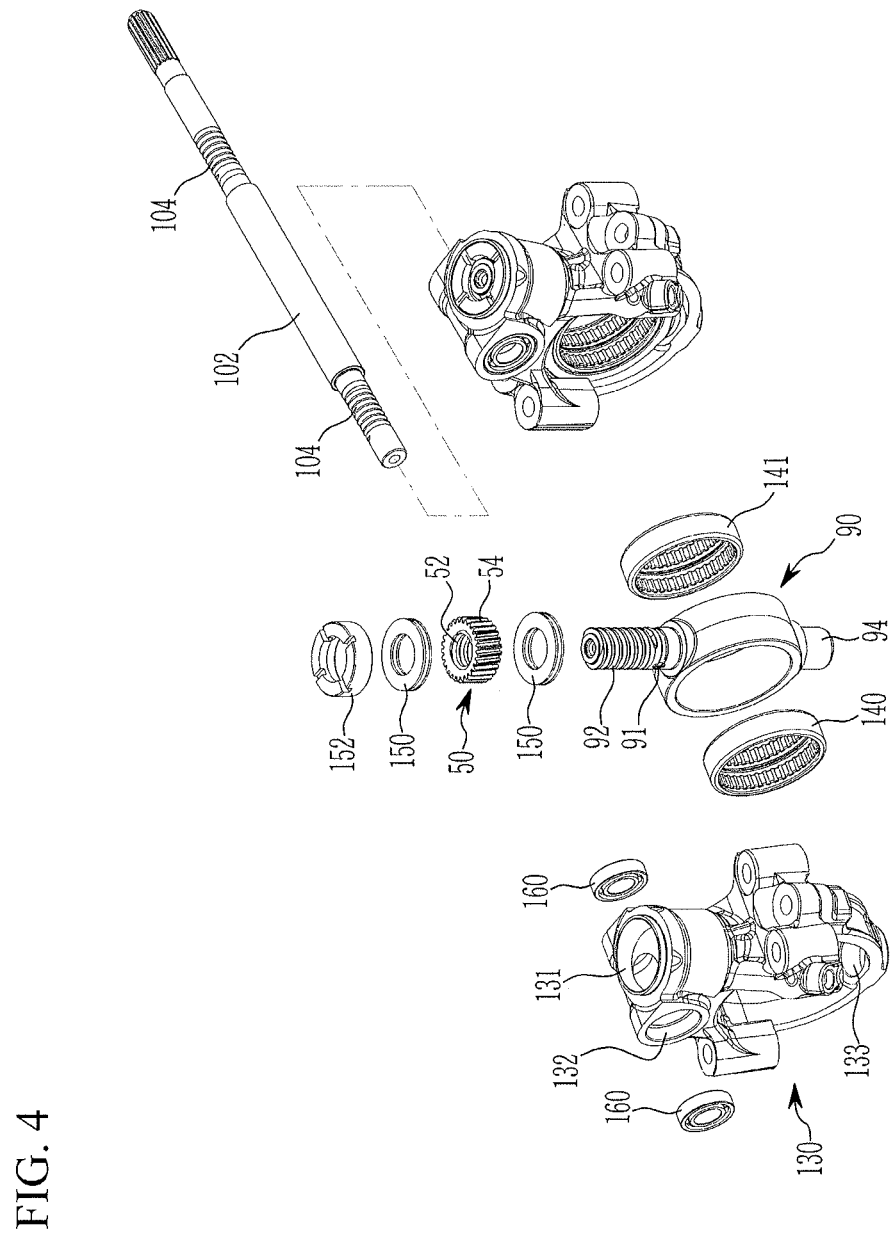
FIG. 4 is a partial exploded perspective view of a continuous variable valve duration apparatus according to an exemplary embodiment of the present invention.

FIG. 3 is an exploded perspective view of a continuous variable valve duration apparatus according to an exemplary embodiment of the present invention and FIG. 4 is a partial exploded perspective view of a continuous variable valve duration apparatus according to an exemplary embodiment of the present invention.

Figure 5:
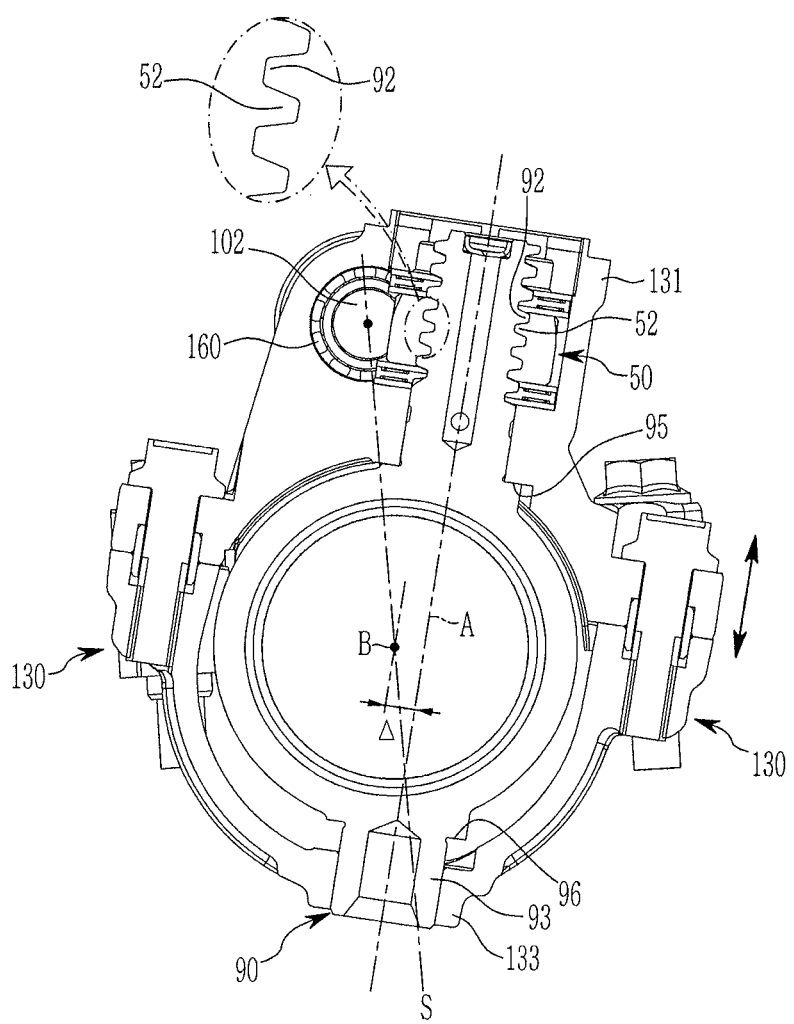
FIG. 5 is a cross-sectional view along line V-V of FIG. 1.
Figure 6:
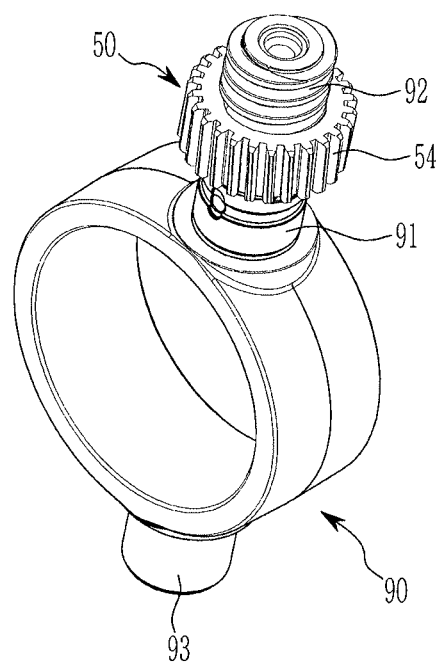
FIG. 6 is a perspective view showing a wheel housing provided to a continuous variable valve duration apparatus according to an exemplary embodiment of the present invention.

FIG. 5 is a cross-sectional view along line V-V of FIG. 1 and FIG. 6 is a perspective view showing a wheel housing provided to a continuous variable valve duration apparatus according to an exemplary embodiment of the present invention.

Referring to FIG. 1 to FIG. 6, an engine 1 according to an exemplary embodiment of the present invention includes a cylinder head 3 and an engine block 5, and a continuous variable valve duration apparatus according to an exemplary embodiment of the present invention is mounted to the cylinder head 3.

In the drawings, 4 cylinders 201, 202, 203 and 204 are formed at the engine, but it is not limited thereto.

A continuous variable valve duration apparatus according to an exemplary embodiment of the present invention may include a camshaft 30, a cam unit 70 on which a cam 71 is formed, and the camshaft 30 inserted into the cam unit 70, a guide bracket 130 having an upper guide boss 131 formed thereon, an internal wheel 80 configured to transmit rotation of the camshaft 30 to the cam unit 70, a wheel housing 90 in which the internal wheel 80 is rotatable inserted, and the wheel housing 90 having a guide shaft 91 on which a guide screw thread 92 is formed, the guide shaft 91 is inserted into the upper guide boss 131 to be movable, a worm wheel 50 to which an internal screw thread 52 configured to engage with the guide screw thread 92 is formed therewithin, and to which an external screw thread 54 is formed thereon, and a control shaft 102 on which a control worm 104 configured to engage with the external screw thread 54 is formed.

The camshaft 30 may be an intake camshaft or an exhaust camshaft.

A control shaft hole 132 is formed at the guide bracket 130 configured to support the control shaft 102, and a control shaft bearing 160 is mounted in the control shaft hole 132 to support rotation of the control shaft 102.

A thrust bearing 150 is mounted to the guide boss 131 configured to support the worm wheel 50 and the thrust bearing 150 as shown in the drawing may be mounted above and below the worm wheel 50, respectively.

A worm cap 152 may be coupled to the guide bracket 130 to support the thrust bearing 150, and for example, the worm cap 152 may be coupled to the guide bracket 130 by caulking.

Referring to FIG. 5, the internal screw thread 52 and the guide screw thread 92 of the worm wheel 50 may be trapezoidal threads.

The thrust bearing 150 allows the worm wheel 50 to rotate smoothly, and the worm cap 152 limits the position of the worm wheel 50.

Thus, the worm wheel 50 is mounted in the fixed position of the guide bracket 130, and the wheel housing 90 may move smoothly in the up and down direction of the drawing as the worm wheel 50 rotates.

A lower guide boss 133 is formed at the guide bracket 130, and a guide rod 94 is formed at the wheel housing 90, and the guide rod 94 is inserted into the lower guide boss 133 to guide the movement of the wheel housing 90. The guide rod 94 guides the movement of the wheel housing 90 and prevents the wheel housing 90 from shaking.

A center B of the internal wheel 80 may be out of the imaginary line A connecting the upper guide boss 131 and the lower guide boss 133 as shown in FIG. 5.

The camshaft 30 and the control shaft 102 may be mounted on an imaginary vertical line S. Therefore, it is possible to prevent the interference of the tool when a bolt is engaged in the cam cap.

Here, the virtual vertical line S phase does not mean being on a completely vertical line, but means a substantially vertical line, in which the line is substantially inclined as approximately equal or less than 10 degrees with respect to a complete vertical line, and an arrangement thereof is configured for minimizing interference when working through a tool.

The center B of the internal wheel 80 is offset (A) from the imaginary line A connecting the upper guide boss 131 and the lower guide boss 133, so that even if a slight inclination is provided to the variable valve duration apparatus, the camshaft 30 and the control shaft 102 may be mounted on a virtual vertical line S.

The wheel housing 90 has an upper stopper 95 and a lower stopper 96 in contact with the guide bracket 130 to limit the movement of the wheel housing 90.

Figure 7:
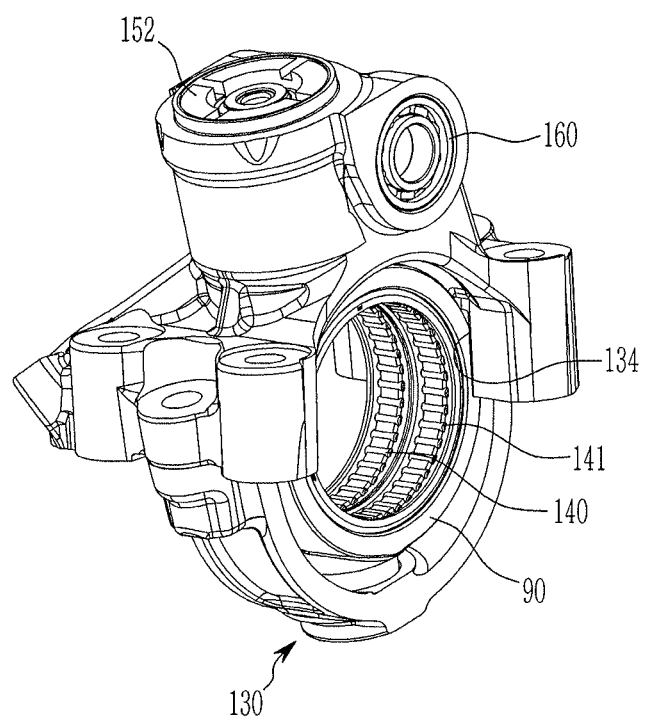
FIG. 7 and FIG. 8 are perspective views showing a guide bracket provided to a continuous variable valve duration apparatus according to an exemplary embodiment of the present invention.
Figure 8:
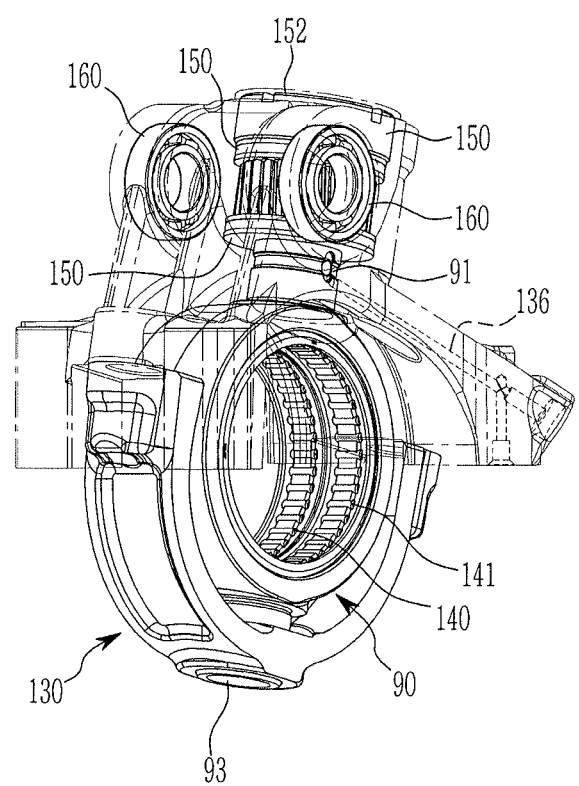

FIG. 7 and FIG. 8 are perspective views showing a guide bracket provided to a continuous variable valve duration apparatus according to an exemplary embodiment of the present invention.

Referring to FIG. 7, the guide bracket 130 may be formed with a stepped surface 134 to prevent rotation of the wheel housing 90.

The upper guide boss 131 and the lower guide boss 133 are formed in the guide bracket 130, so that the wheel housing 90 may rotate and the knitting wear may occur.

According to an exemplary embodiment of the present invention, the stepped surface 134 is formed on the guide bracket 130 on the boss for engaging the bolt, reducing the number of components and preventing the wheel housing 90 from rotating.

Referring to FIG. 8, the guide bracket 130 may have a bracket oil hole 136 for supplying lubrication oil to the worm wheel 50.

According to an exemplary embodiment of the present invention, since the control shaft bearing 160 and the worm cap 152 form a chamber, supplying oil to the worm wheel 50 through the bracket oil hole 136 minimizes oil pressure loss and enables proper oil supply to each part.

Figure 9:
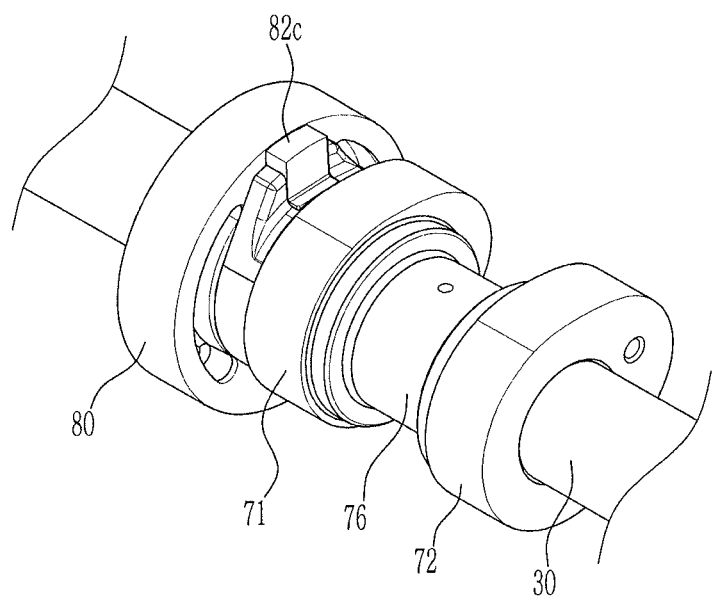
FIG. 9 is a perspective view showing an internal wheel and a cam unit provided to a continuous variable valve duration apparatus according to an exemplary embodiment of the present invention.
Figure 10:
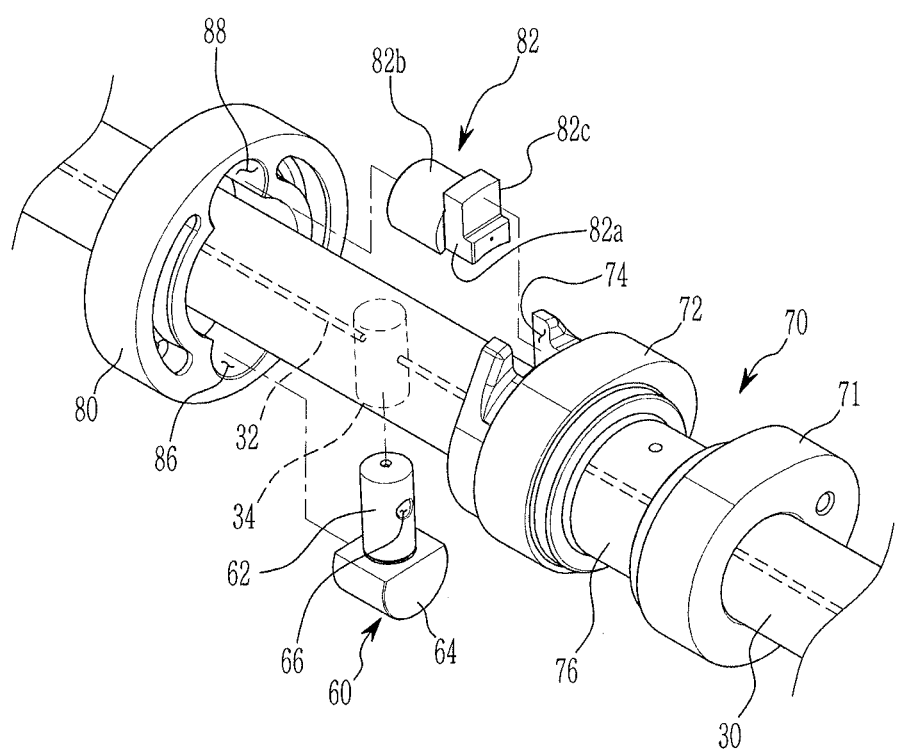
FIG. 10 is an exploded perspective view showing an internal wheel and a cam unit provided to a continuous variable valve duration apparatus according to an exemplary embodiment of the present invention.

FIG. 9 is a perspective view showing an internal wheel and a cam unit provided to a continuous variable valve duration apparatus according to an exemplary embodiment of the present invention and FIG. 10 is an exploded perspective view showing an internal wheel and a cam unit provided to a continuous variable valve duration apparatus according to an exemplary embodiment of the present invention.

Referring to FIG. 1 to FIG. 10, a first sliding hole 86 and a second sliding hole 88 are formed to the internal wheel 80 respectively and a cam slot 74 is formed at the cam unit 70.

The continuous variable valve duration apparatus further includes a roller wheel 60 connected to the camshaft 30 and rotatably inserted into the first sliding hole 86 and a roller cam 82 slidably inserted into the cam slot 74 and rotatabley inserted into the second sliding hole 88.

The roller cam 82 includes a roller cam body 82a slidably inserted into the cam slot 74 and a cam head 82b rotatably inserted into the second sliding hole 88.

A protrusion 82c is formed at the roller cam 82 for preventing the roller cam 82 from being separated from the internal wheel 80 along the longitudinal direction of the camshaft 30.

The roller wheel 60 includes a wheel body 62 slidably connected to the camshaft 30 and a wheel head 64 rotatably inserted into the first sliding hole 86 and the wheel body 62 and the wheel head 64 may be integrally formed.

A camshaft hole 34 is formed at the camshaft 30, the wheel body 62 of the roller wheel 60 is movably inserted into the camshaft hole 34 and the wheel head 64 is rotatably inserted into the first sliding hole 86.

A camshaft oil hole 32 is formed within the camshaft 30 along a longitudinal direction thereof, a body oil hole 66 communicating with the camshaft oil hole 32 is formed at the wheel body 62 of the roller wheel 60 and an oil groove 68 (referring to FIG. 13) communicating with the body oil hole 66 is formed at the wheel head 64 of the roller wheel 60.

Lubricant supplied to the camshaft oil hole 32 may be supplied to the internal wheel 80 through the body oil hole 66, the communicate hole 69 and the oil groove 68.

Figure 11:
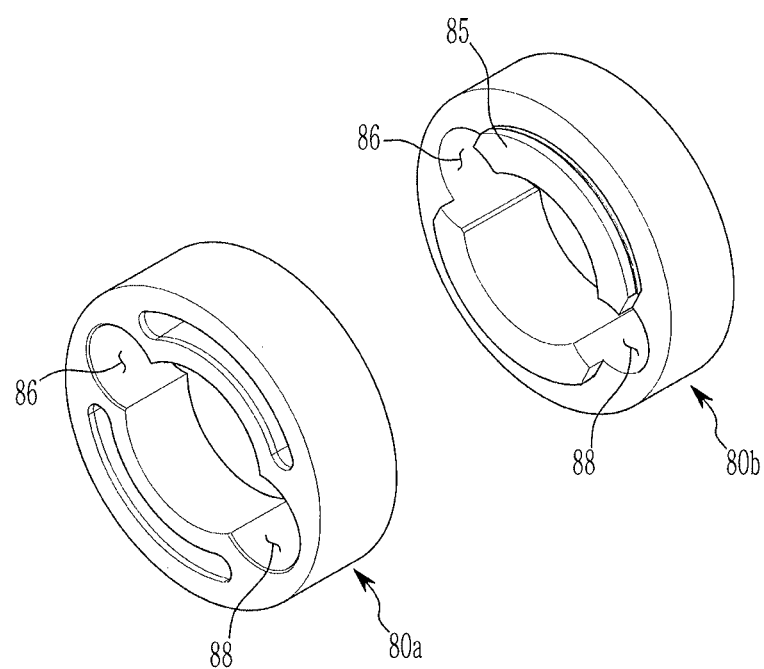
FIG. 11 is a perspective view of and internal wheel provided to a continuous variable valve duration apparatus according to an exemplary embodiment of the present invention.
Figure 12:
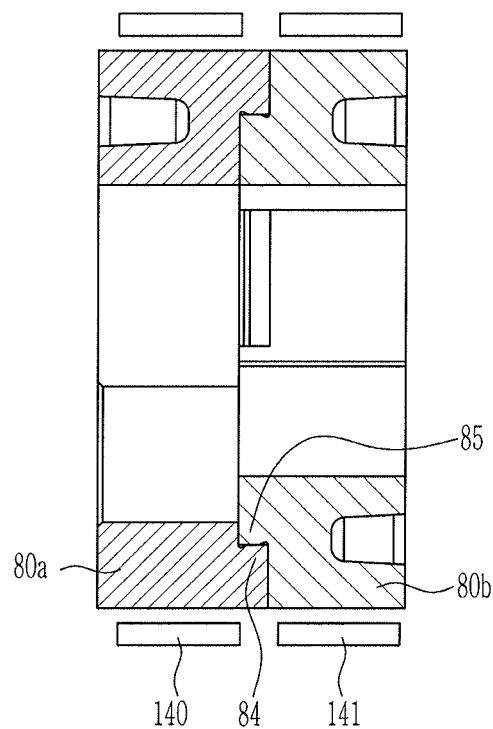
FIG. 12 is a cross-sectional view of and internal wheel provided to a continuous variable valve duration apparatus according to an exemplary embodiment of the present invention.

FIG. 11 is a perspective view of and internal wheel provided to a continuous variable valve duration apparatus according to an exemplary embodiment of the present invention and FIG. 12 is a cross-sectional view of and internal wheel provided to a continuous variable valve duration apparatus according to an exemplary embodiment of the present invention.

Referring to FIG. 2, FIG. 11 and FIG. 12, the cam unit 70 includes a first cam portion 70a and a second cam portion 70b which are mounted corresponding to a cylinder and an adjacent cylinder respectively, for example the first cylinder 201 and the adjacent second cylinder 202 and the internal wheel 80 includes a first internal wheel 80a and a second internal wheel 80b transmitting rotation of the camshaft 30 to the first cam portion 70a and the second cam portion 70b respectively.

The continuous variable valve duration apparatus further includes first and second bearings 140 and 141 internally mounted within the wheel housing 90 for supporting the first internal wheel 80a and the second internal wheel 80b respectively.

The first and second bearings 140 and 141 may be needle bearings, the first and the second internal wheels 80a and 80b are internally mounted within one wheel housing 90 and the first and second bearings 140 and 141 may rotatably support the first and the second internal wheels 80a and 80b respectively.

Since the first and the second internal wheels 80a and 80b may be internally mounted within one wheel housing 90, element numbers may be reduced, so that productivity and manufacturing economy may be enhanced.

The first internal wheel 80a and the second internal wheel 80b within the wheel housing 90 may be connected rotatable to each other. For example, a first internal wheel connecting portion 84 and a second internal wheel connecting portion 85 are formed at the first internal wheel 80a and the second internal wheel 80b respectively, and the first internal wheel connecting portion 84 and the second internal wheel connecting portion 85 are connected to each other.

In the drawing, the first internal wheel connecting portion 84 and the second internal wheel connecting portion 85 are formed as convex and concave, it is not limited thereto. The first internal wheel 80a and the second internal wheel 80b are connected to be rotatable to each other with variable connecting structures.

In the case that the first internal wheel 80a and the second internal wheel 80b are connected, looseness or vibration due to manufacturing tolerances of the bearing, the internal wheel, the wheel housing and the like may be reduced.

Two cams 71 and 72 may be formed on the first and the second cam portions 70a and 70b as a pair and a cam cap connecting portion 76 is formed between the paired cams 71 and 72 of each of the first and second cam portions 70a and 70b.

The cam 71 and 72 rotate and open the valve 200.

Figure 13:
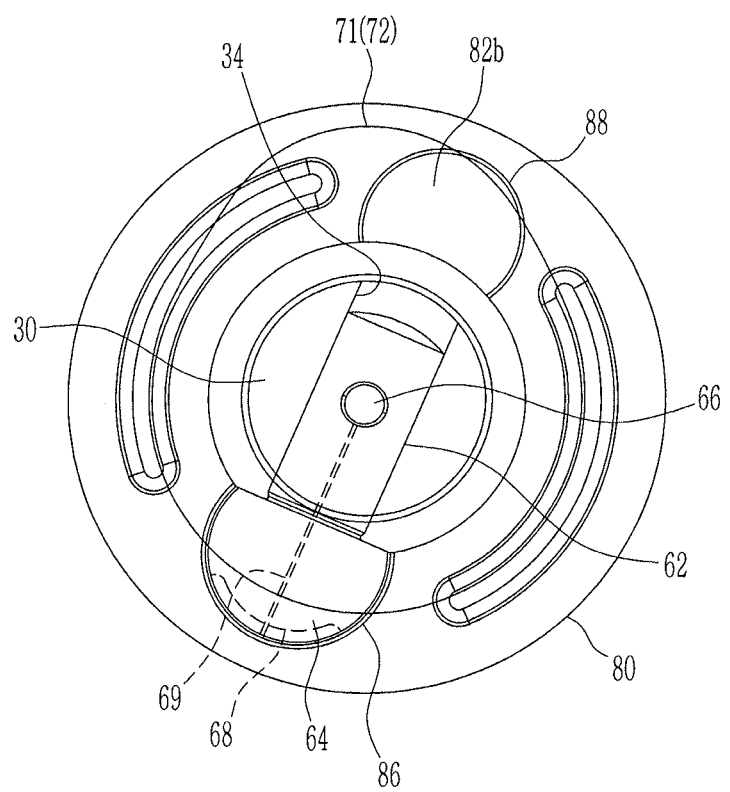
FIG. 13, FIG. 14 and FIG. 15 are drawings showing operations of an internal wheel of a continuous variable valve duration apparatus according to an exemplary embodiment of the present invention.
Figure 14:
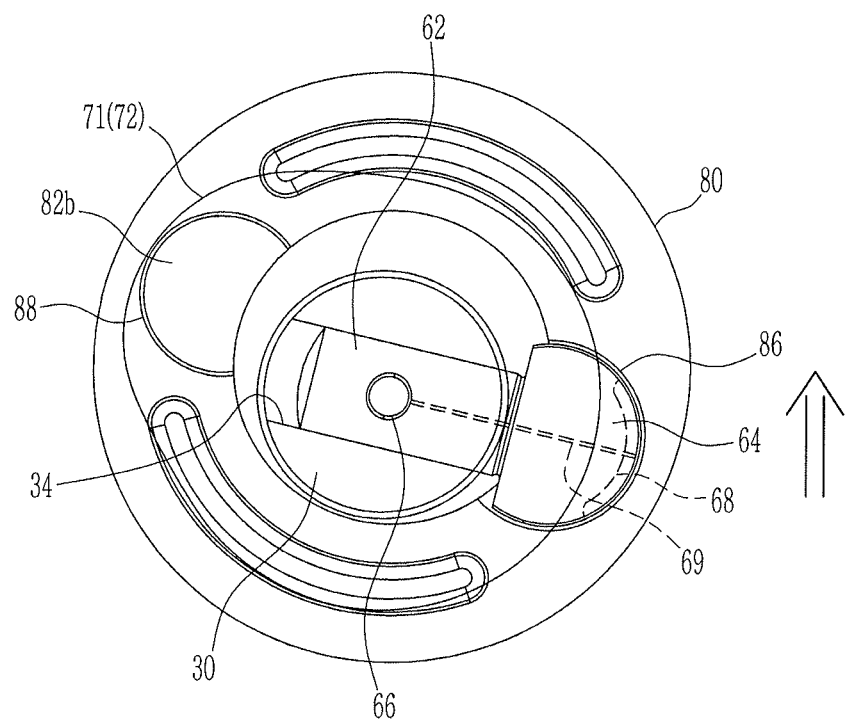
Figure 15:
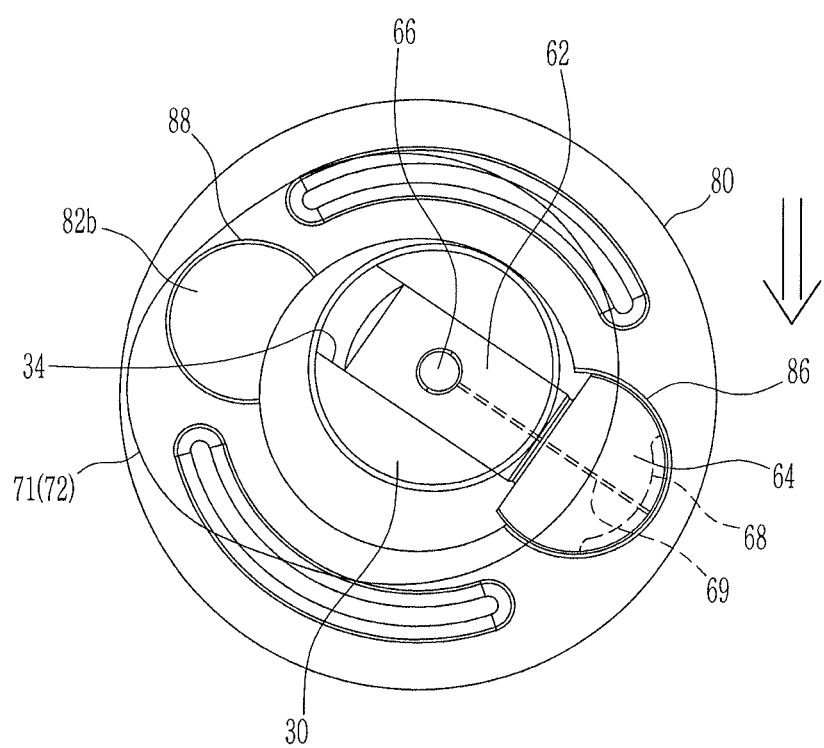

FIG. 13, FIG. 14 and FIG. 15 are drawings showing operations of an internal wheel of a continuous variable valve duration apparatus according to an exemplary embodiment of the present invention.

As shown in FIG. 13, when rotation centers of the camshaft 30 and the cam unit 70 are coincident, the cams 71 and 72 rotate with the same phase angle of the camshaft 30.

According to engine operation states, an ECU (engine control unit or electric control unit) transmits control signals to the control portion 100, and then the control motor 106 rotates the control shaft 102.

Referring to FIG. 5, FIG. 14 and FIG. 15, when the control worm 104 engaged with the external screw thread 54 of the worm wheel 50 rotates, the guide screw thread 92 engaged with the internal screw thread 52 moves relatively.

That is, rotation of the control shaft 102 causes the worm wheel 50 to rotate and change the relative position of the wheel housing 90 relative to camshaft 30.

If the position of the wheel housing 90 moves up or down relative to the rotation center of the camshaft 30, the rotation speed of the cam 71 and 72 relative to the camshaft 30 changes with its phase.

While the slider pin 60 is rotated with the camshaft 30, the pin body 62 is slidable within the camshaft hole 34, the pin head 64 is rotatable within the first sliding hole 86, and the roller cam 82 is rotatably within the second sliding hole 88 and slidable within the cam slot 74. Thus, the relative rotation speed of the cams 71 and 72 with respect to the rotation speed of the camshaft 30 is changed.

Figure 16A:
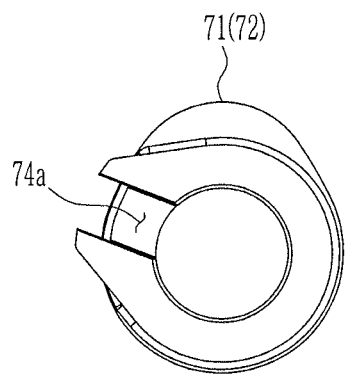
FIG. 16A and FIG. 16B are drawings showing a cam slot of a continuous variable valve duration apparatus according to an exemplary embodiment of the present invention.
Figure 16B:
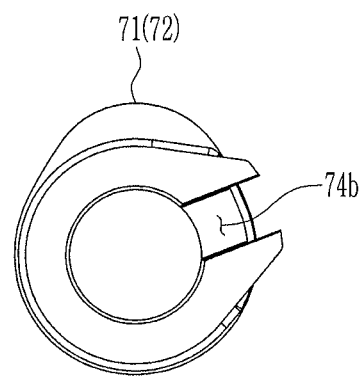
Figure 17A:
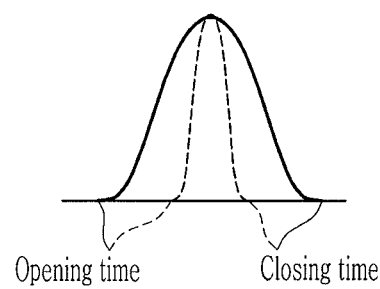
FIG. 17A, FIG. 17B and FIG. 17C are graphs showing valve profile of a continuous variable valve duration apparatus according to an exemplary embodiment of the present invention.
Figure 17B:
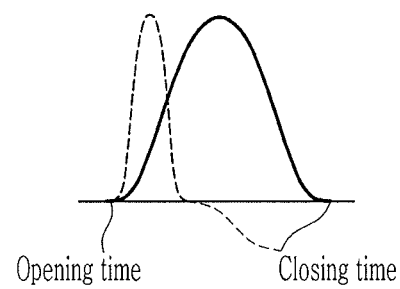
Figure 17C:
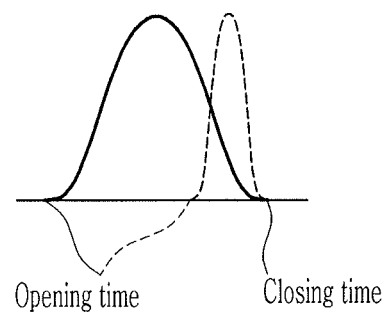

FIG. 16A and FIG. 16B are drawings showing a cam slot of a continuous variable valve duration apparatus according to an exemplary embodiment of the present invention and FIG. 17A, FIG. 17B and FIG. 17C are graphs showing valve profile of a continuous variable valve duration apparatus according to an exemplary embodiment of the present invention.

As shown in FIG. 16A and FIG. 16B, the cam slot 74 may be formed more retarded than a position of the cam 71 or 72 (referring to FIG. 16A) or the cam slot 74 may be formed more advanced than a position of the cam 71 or 72 (referring to FIG. 16B), or the cam slot 74 may be formed with the same phase of the cam 71 or 72. With the above scheme, various valve profiles may be achieved.

Although maximum lift of the valve 200 is constant, however rotation speed of the cam 71 and 72 with respect to the rotation speed of the camshaft 30 is changed according to relative positions of the slider housing 90 so that closing and opening time of the valve 200 is changed. That is, duration of the valve 200 is changed.

According to the relative position of the cam slot 74, mounting angle of the valve 200 and the like, opening and closing time of the valve may be simultaneously changed as shown in FIG. 17A.

While opening time of the valve 200 is constant, closing time of the valve 200 may be retarded or advanced as shown FIG. 17B.

While closing time of the valve 200 is constant, opening time of the valve 200 may be retarded or advanced as shown FIG. 17C.

As described above, a continuous variable valve duration apparatus according to an exemplary embodiment of the present invention may achieve various valve duration with a simple construction.

The continuous variable valve duration apparatus according to an exemplary embodiment of the present invention may be reduced in size and thus an entire height of a valve train may be reduced.

Since the continuous variable valve duration apparatus may be applied to a conventional engine without excessive modification, thus productivity may be enhanced and production cost may be reduced.

The continuous variable valve duration apparatus according to an exemplary embodiment of the present invention may reduce the number of parts and reduce vibration and noise by applying a worm wheel.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A variable valve duration control apparatus comprising:
a camshaft;
a cam unit including a cam, wherein the camshaft is inserted into the cam unit;
a guide bracket including an upper guide boss;
an internal wheel engaged between the camshaft and the cam unit so as to transmit a rotation of the camshaft to the cam unit;
a wheel housing in which the internal wheel is rotatably inserted, wherein the wheel housing includes a guide shaft with a guide screw thread, and wherein the guide shaft is configured to move in the upper guide boss;
a control shaft including a control worm;
a worm wheel mounted in the upper guide boss, the worm wheel including:
a worm wheel axis,
an internal screw thread configured to engage the guide screw thread, and
an external screw thread configured to engage the control worm,
wherein the worm wheel is configured to rotate about a fixed position along the worm wheel axis with respect to the upper guide boss, and
wherein the wheel housing moves integrally with the guide shaft along the worm wheel axis as the worm wheel rotates.

2. The variable valve duration control apparatus of claim 1, wherein the upper guide boss further includes a thrust bearing configured to support the worm wheel.

3. The variable valve duration control apparatus of claim 2, wherein the guide bracket further includes a worm cap configured to support the thrust bearing.

4. The variable valve duration control apparatus of claim 1, wherein the guide bracket further includes a control shaft hole configured to support the control shaft.

5. The variable valve duration control apparatus of claim 4, wherein the control shaft hole includes a control shaft bearing configured to rotationally support the control shaft.

6. The variable valve duration control apparatus of claim 1, wherein:
the guide bracket further includes a lower guide boss,
the wheel housing further includes a guide rod, and
the guide rod is inserted into the lower guide boss so as to guide the movement of the wheel housing along the worm wheel axis.

7. The variable valve duration control apparatus of claim 6, wherein a center of the internal wheel is offset from the worm wheel axis.

8. The variable valve duration control apparatus of claim 7, wherein an imaginary line, which connects the center of the internal wheel to an axis of the control shaft, intersects the worm wheel axis at an acute angle.

9. The variable valve duration control apparatus of claim 1, wherein the internal screw thread and the guide screw thread are trapezoidal threads.

10. The variable valve duration control apparatus of claim 1, wherein the wheel housing further includes an upper stopper and a lower stopper each configured to limit the movement of the wheel housing within the guide bracket.

11. The variable valve duration control apparatus of claim 1, wherein the guide bracket further includes a stepped surface configured to prevent rotation of the wheel housing about the worm wheel axis.

12. The variable valve duration control apparatus of claim 1, wherein the guide bracket further includes a bracket oil hole configured to supply lubrication oil to the worm wheel.

13. The variable valve duration control apparatus of claim 1, wherein:
the internal wheel includes a first sliding hole and a second sliding hole,
the cam unit further includes a cam slot,
a roller wheel is slidably connected to the camshaft and rotatably inserted into the first sliding hole, and
a roller cam is slidably inserted into the cam slot and rotatably inserted into the second sliding hole.

14. The variable valve duration control apparatus of claim 13, wherein the roller cam includes:
a roller cam body slidably inserted into the cam slot;
a cam head rotatably inserted into the second sliding hole; and
a protrusion configured to inhibit the roller cam from being removed.

15. The variable valve duration control apparatus of claim 14, wherein the roller wheel includes:
a wheel body slidably connected to the camshaft; and
a wheel head rotatably inserted into the first sliding hole.

16. The variable valve duration control apparatus of claim 15, wherein:
the camshaft includes a camshaft oil hole extending along a longitudinal direction of the camshaft,
the wheel body includes a body oil hole configured to communicate with the camshaft oil hole, and
the wheel head includes an oil groove configured to communicate with the body oil hole.

17. The variable valve duration control apparatus of claim 1,
wherein the cam unit further includes a first cam portion and a second cam portion corresponding to a first engine cylinder and an adjacent second engine cylinder, respectively; and
wherein the internal wheel includes a first internal wheel and a second internal wheel configured to transmit the rotation of the camshaft to the first cam portion and the second cam portion, respectively.

18. The variable valve duration control apparatus of claim 17, wherein the first internal wheel and the second internal wheel are rotatably connected to each other.

19. The variable valve duration control apparatus of claim 17, wherein the wheel housing further includes an internally mounted bearing configured to support the first internal wheel and the second internal wheel.

20. An engine comprising the variable valve duration control apparatus of claim 1.

21. The variable valve duration control apparatus of claim 1, wherein the wheel housing is configured to move vertically within the guide bracket.

22. The variable valve duration control apparatus of claim 1, wherein the wheel housing further includes a guide rod coaxially aligned with the guide shaft.

* * * * *